United States Patent [19]

Nishioka

[11] Patent Number: 5,642,177

[45] Date of Patent: Jun. 24, 1997

[54] DETACHABLE SUNGLASSES WITH MAGNETS

[75] Inventor: Takahiro Nishioka, Sabae, Japan

[73] Assignee: Sunreeve Company Limited, Sabae, Japan

[21] Appl. No.: 353,452

[22] Filed: Dec. 9, 1994

[51] Int. Cl.⁶ .............................. G02C 9/00; G02C 7/10; G02C 5/08
[52] U.S. Cl. ............................ 351/47; 351/44; 351/63
[58] Field of Search ............................ 351/44, 47, 57, 351/63, 124, 133, 140, 158, 48; 2/13, 454

[56] References Cited

U.S. PATENT DOCUMENTS

| 1,679,233 | 2/1928 | Strauss | 351/48 |
| 2,737,847 | 3/1956 | Tesauro | 351/57 |
| 3,531,190 | 9/1970 | LeBlanc | 351/113 |
| 3,838,914 | 10/1974 | Fernandez | 351/106 |
| 4,070,103 | 1/1978 | Meeker | 351/47 |
| 4,196,981 | 4/1980 | Waldrop | 351/59 |
| 5,181,051 | 1/1993 | Townsend et al. | 351/52 |
| 5,243,366 | 9/1993 | Blevins | 351/57 |
| 5,321,442 | 6/1994 | Albanese | 351/44 |
| 5,389,981 | 2/1995 | Riach | 351/158 |
| 5,416,537 | 5/1995 | Sadler | 351/57 |

FOREIGN PATENT DOCUMENTS

| 1797366 | 1/1971 | Germany . |
| 8806898 | 9/1988 | Germany . |
| 4316698 | 11/1994 | Germany . |
| 4415392 | 3/1969 | Japan . |
| 57-184910 | of 1982 | Japan . |
| 61-002621 | 1/1986 | Japan . |
| 63-188626 | 12/1988 | Japan . |
| 540493 | 10/1993 | Japan . |
| 710722 | 2/1995 | Japan . |
| WO90/09611 | 8/1990 | WIPO . |

OTHER PUBLICATIONS

"International Glasses Design Competition" '93 Japan, Oct. 5, 1993, p. 67.

"The Pride of the State Woos QVC Judges," PR Newswire, Jul. 27, 1995, available on LEXIS.

Joanna Sullivan, "Entrepreneurs tapped by QVC," Baltimore Business Journal, vol. 13, No. 10, Jul. 28, 1995, Sec. 1, p. 2.

*Primary Examiner*—Huy Mai
*Attorney, Agent, or Firm*—Knobbe, Martens, Olson & Bear

[57] ABSTRACT

Detachable sunglasses with magnets which are inexpensive, handled easily, not an obstacle when not in use stably attached, and not incongruous when used. Detachable templeless sunglasses comprises templeless sunglasses composed of sunglasses and a frame comprising a magnet to either end thereof, and eyeglasses composed of glasses and a frame comprising a magnet to either end thereof to make said templeless sunglasses detachable to said eyeglasses. The templeless sunglasses are provided with a hinge at the bridge of their frame to make them foldable.

4 Claims, 2 Drawing Sheets

DETACHABLE SUNGLASSES WITH MAGNETS

BACKGROUND OF THE INVENTION

1. Field of the Invention

This invention relates to detachable sunglasses with magnets, which can be easily attached to and detached from eyeglasses frames.

2. Background Art

Generally, eyeglasses and sunglasses are different bodies, so that it is necessary to have both of them when anyone goes out. To remedy such inconvenience, various eyeglasses have been proposed including those which use dimmer lenses to automatically adjust color gradations to give a function of sunglasses, those provided with clip-on sunglasses, and those with templeless sunglasses positioned inside thereof.

However, the eyeglasses using the dimmer lenses have a disadvantage that they ere expensive. When the eyeglasses have the clip-on sunglasses, it is troublesome to move the sunglasses up and down, and when the sunglasses are not used, they stay in an up position, making a nuisance. On the other hand, since the templeless sunglasses have their both ends simply hanged on the both temples of eyeglasses, they are not stable. Besides, the templeless sunglasses are disagreeable and incongruous because they are positioned inside of the eyeglasses.

The present invention has been completed to remedy the above disadvantages and it is an object of the present invention to provide detachable sunglasses with magnets which are inexpensive, easily handled, not an obstacle when not being used, stably fitted, and not incongruous when used.

SUMMARY OF THE INVENTION

According to a first aspect of the present invention, detachable sunglasses with magnets are provided, which comprises templeless sunglasses composed of sunglasses and a frame comprising a magnet to either end thereof, and eyeglasses composed of glasses and a frame comprising a magnet to either end thereof to make said templeless sunglasses detachable to said eyeglasses.

Furthermore, according to a second aspect of the present invention, detachable sunglasses with magnets are provided, which comprises templeless sunglasses composed of sunglasses and a frame and eyeglasses composed of glasses and another frame, wherein magnets ere attached to either end of one of frames for templeless sunglasses or eyeglasses, and the other frame has a property attracted by magnetic force to make the templeless sunglasses detachable to said eyeglasses.

In addition, according to a third aspect of the present invention, detachable sunglasses with magnets are provided, wherein the templeless sunglasses are provided with a hinge at the bridge of the frame to make it foldable.

The objects and advantages of the present invention will become apparent from the detailed description to follow taken in conjunction with the appended claims.

DETAILED DESCRIPTION OF THE PREFERRED EMBODIMENTS

Embodiments of this invention will be described in detail with reference to the attached drawings.

Figure 1:
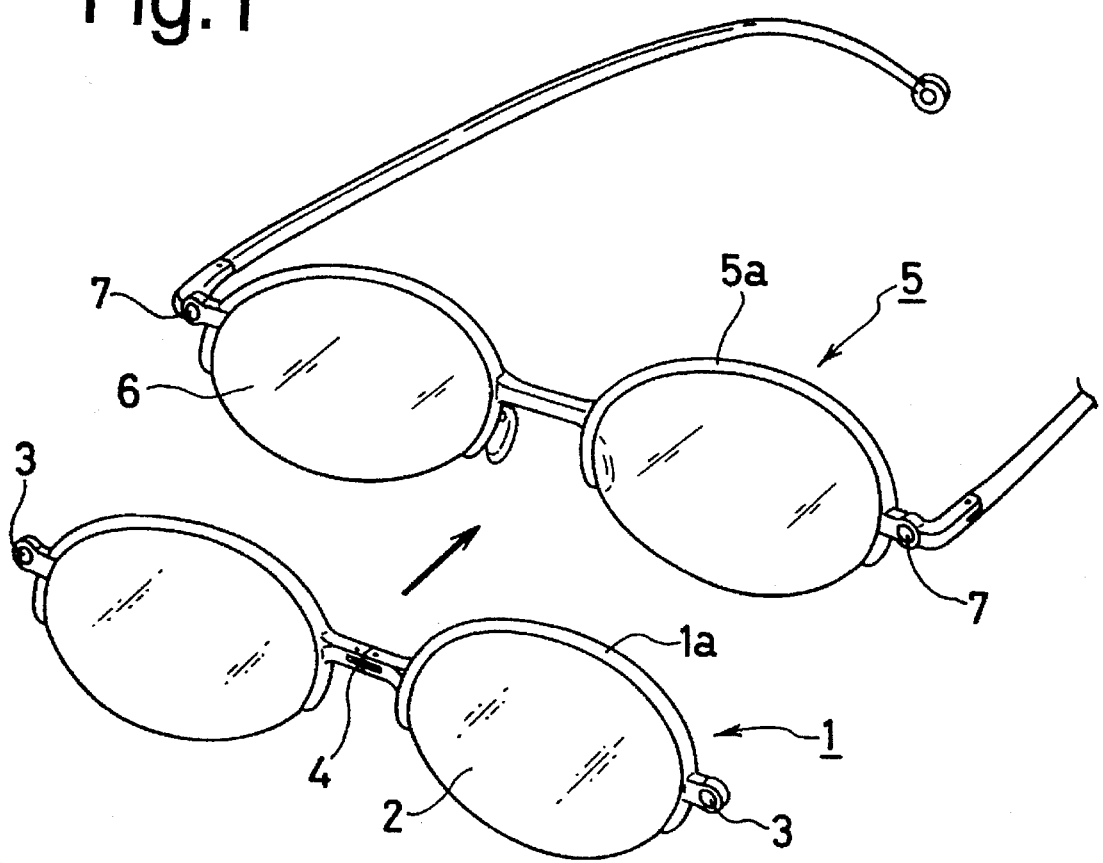
FIG. 1 is a perspective view of essential portions showing one embodiment of the present invention.

In FIG. 1, reference numeral 1 is templeless sunglasses, and colored lenses 2 are fitted to a frame 1a. And a small round magnet 3 is attached to each end of the frame 1a. A hinge 4 is disposed at the bridge of the frame 1a, making it possible to fold the frame 1a at the hinge 4.

Reference numeral 5 represents a pair of eyeglasses wherein lenses 6 with a required degree are fitted to a frame 5a, and a smell round magnet 7 which is magnetically connected to each magnet 3 of the templeless sunglasses is attached to each end of the frame 5a. The kind of magnet employable in the present invention is not specially limited, and thus any type of magnets may be used in the present invention.

Figure 2:
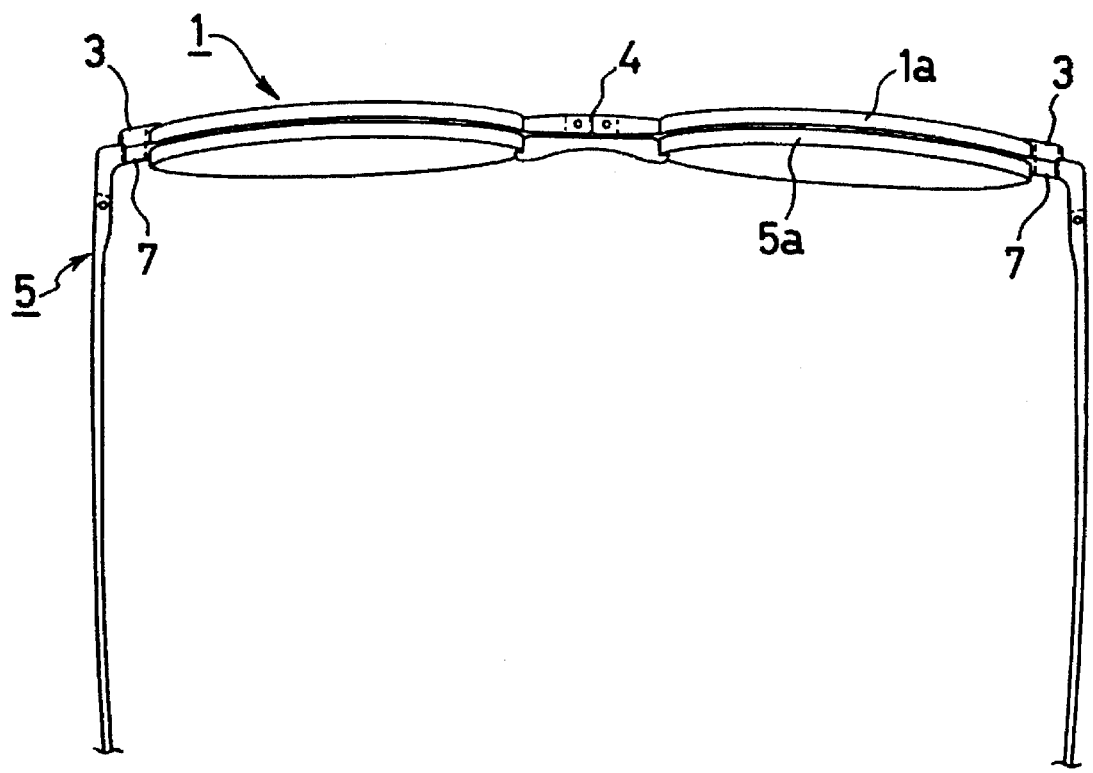
FIG. 2 is a plan view of essential portions showing the templeless sunglasses attached to eyeglasses according to the present invention.

The templeless sunglasses 1 can be detachably attached to the front of the eyeglasses 5. Namely, as shown in FIG. 2, when the templeless sunglasses 1 are put on the front of the eyeglasses 5, the magnets 3 of the templeless sunglasses 1 are magnetically connected to the magnets 7 of the eyeglasses 5. Thus, the eyeglasses. 5 can be used as eyeglasses provided with sunglasses. As shown in FIG. 1, the templeless sunglasses 1 preferably have substantially the same shape as the front portion of the eyeglasses 5.

Figure 3:
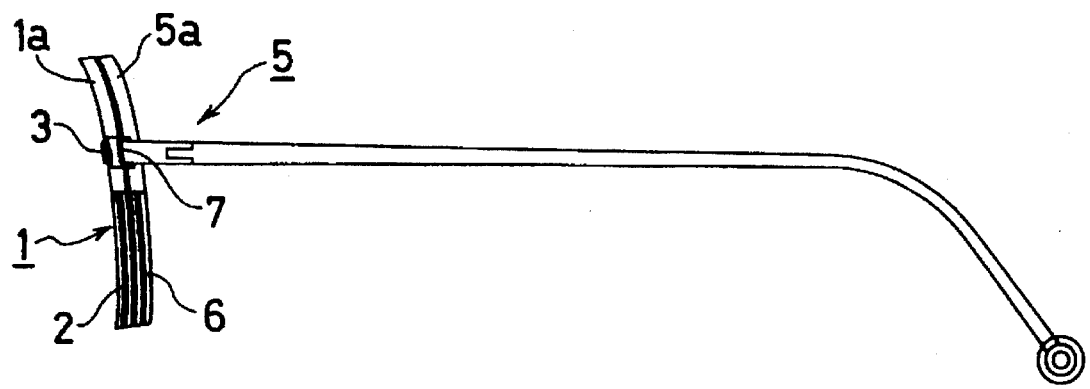
FIG. 3 is a side view of FIG. 2.

In this case, as shown in FIG. 3, when the templeless sunglasses 1 and the eyeglasses 5 are previously designed to have the same size so that they fit perfectly, their appearances are remarkable. And it is preferable to previously make positioning so that the magnets 3 of the templeless sunglasses 1 perfectly fit to the magnets 7 of the eyeglasses 5.

When the frame 5a of the eyeglasses 5 is made of a material which has a property attracted by magnetic force, the frame 5a of the eyeglasses 5 is not required to have magnets because the magnets 3 of the templeless sunglasses 1 can be magnetically connected to the frame 5a. And, when the frame 1a of the templeless sunglasses 1 is made of such a material having a property attracted by magnetic force, the templeless sunglasses 1 do not need the magnets and only the eyeglasses comprise magnets 7 because the magnets 7 of the eyeglasses 5 can be magnetically connected to the frame 1a. In other words, it is sufficient by disposing the magnets on either of one of the frames of the templeless sunglasses 1 or the eyeglasses 5 when the other frame is made of such a material having a property attracted by magnetic force. In the present invention, any kinds of material having a property attracted by magnetic force may be used.

Besides, even when the eyeglasses and the templeless sunglasses have a synthetic resin frame, this invention can be applied by attaching the magnets to both of them as in the above embodiment.

Figure 4:
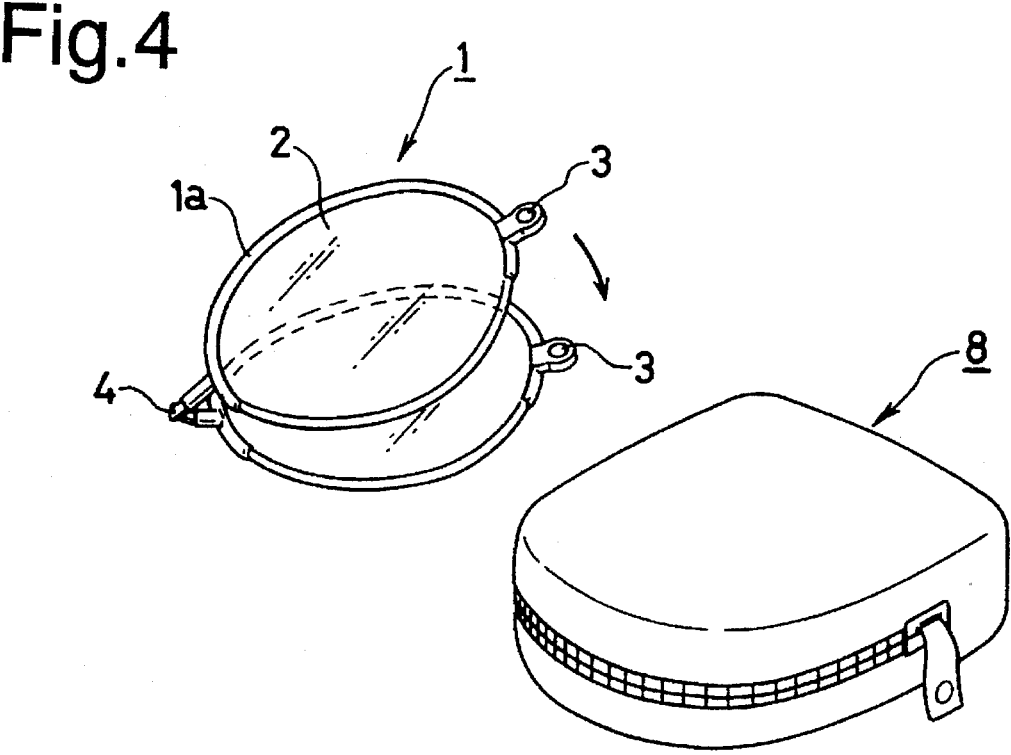
FIG. 4 is a perspective view showing how the templeless sunglasses are folded and a storage case exclusive to them.

When sunglasses are not needed, the templeless sunglasses 1 can be removed from the eyeglasses 5. In this case, the templeless sunglasses 1 can be removed without using any tool because they are magnetically connected to the eyeglasses 5. As shown in FIG. 4, the removed templeless sunglasses 1 can be folded double at the hinge 4 of the bridge of the frame 1a. And, the magnets 3 at the both ends are magnetically connected to each other to lock and to prevent the templeless sunglasses 1 from opening unexpectedly. Therefore, it is convenient to carry them in a pocket or a handbag, and they can also be suitably carried in a dedicated storage case 8.

Removal of the templeless sunglasses 1 reveals the magnets 7 of the eyeglasses 5, but appropriate coloring of the magnets 7 provides a design function as a dandyish mark. And it is also possible to attach a smell metallic accessory such as a chain to make the appearances fashionable.

As described above, according to the present invention, when sunglasses are needed, the templeless sunglasses can be magnetically attached to the front of an eyeglasses frame, and when the sunglasses are not needed, the templeless sunglasses can be easily removed. The removed templeless sunglasses are conveniently carried because they can be folded at the bridge.

Thus, according to this invention, the templeless sunglasses can be magnetically attached to or detached from the front of ordinary eyeglasses, provided inexpensively without using dimmer lenses, simply attached or detached, easily handled, and stably attached when used. Besides, the templeless sunglasses can be used without causing an incongruous feeling, removed from the eyeglasses when not needed so as not to make a nuisance, and folded to make it convenient for carrying.

What is claimed is:

1. An eyeglass set comprising:

a pair of eyeglass lenses;

a first frame comprising a right temple, a left temple, and a front portion for holding said pair of eyeglass lenses, said front portion provided with first and second magnetic attachments at first and second positions on said first frame, said first and second positions being near said right and left temples respectively, said first and second magnetic attachments being embedded in said front portion without protruding substantially from the surface of said front portion;

a pair of sunglass lenses; and a second frame for holding said pair of sunglass lenses, said second frame having no temples and being provided with third and fourth magnetic attachments at positions which correspond to said first and second positions on said first frame so as to magnetically attach said third and fourth magnetic attachments to said first and second magnetic attachments, said third and fourth magnetic attachments being embedded in said second frame without protruding substantially from the surface of said second frame, said second frame having a shape capable of being fitted to said front portion of said first frame, so that said second frame can be detachably attached to said first frame.

2. The eyeglass set according to claim 1, wherein said second frame further comprises a hinge at the bridge located between said pair of sunglass lenses, whereby said second frame can be folded in half.

3. The eyeglass set according to claim 2, wherein when said second frame is folded, said third and fourth magnetic attachments attach magnetically so as to retain said second frame in a folded configuration.

4. The eyeglass set according to claim 1, wherein said second frame has a shape substantially the same as said front portion of said first frame.

* * * * *